Figure 1:
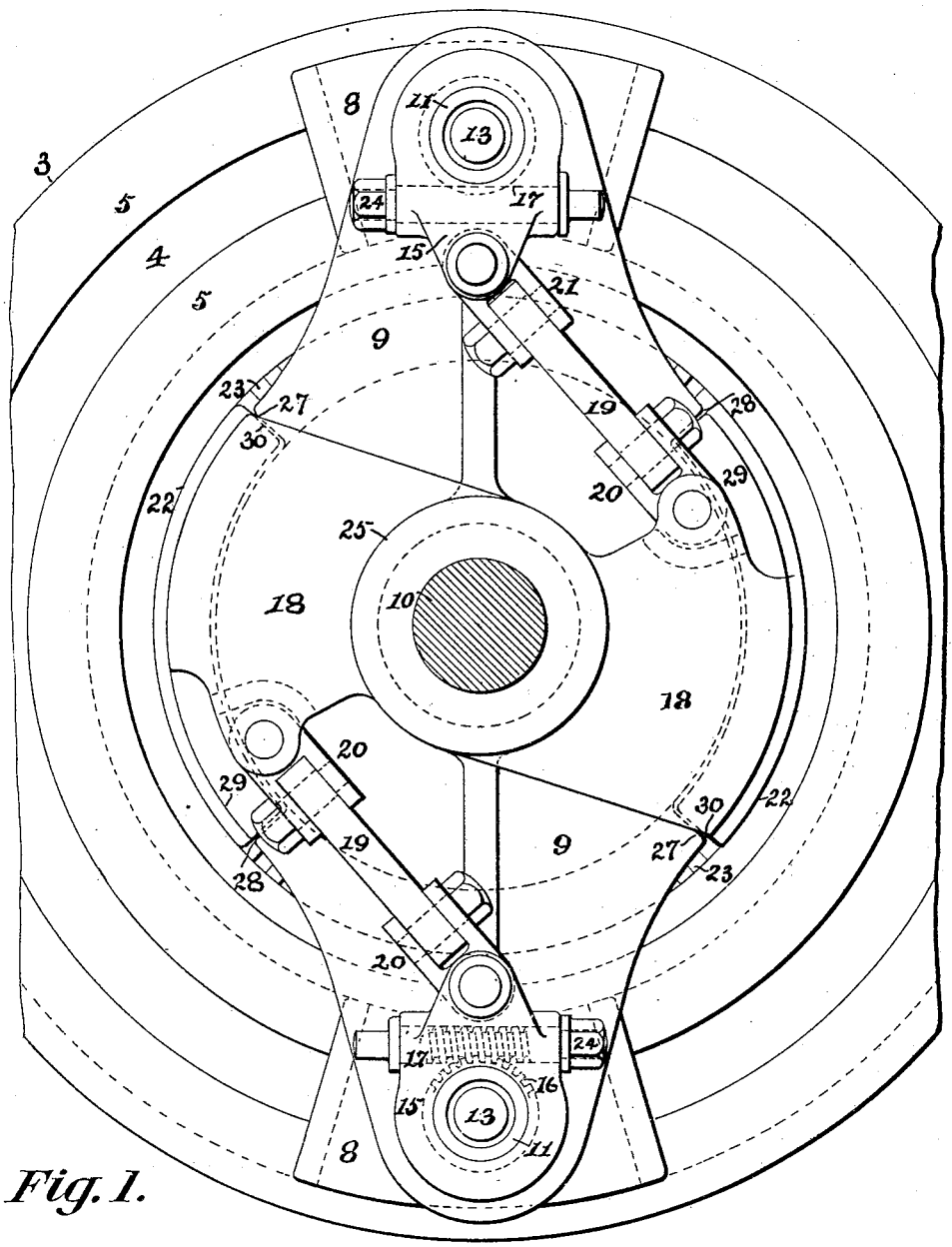

No. 713,341. Patented Nov. 11, 1902.
A. C. PESSANO.
CLUTCH FOR SHAFTS AND PULLEYS.
(Application filed Feb. 15, 1902.)

(No Model.) 3 Sheets—Sheet 1.

Witnesses:

Inventor
Antonio C. Pessano
by
Attorney.

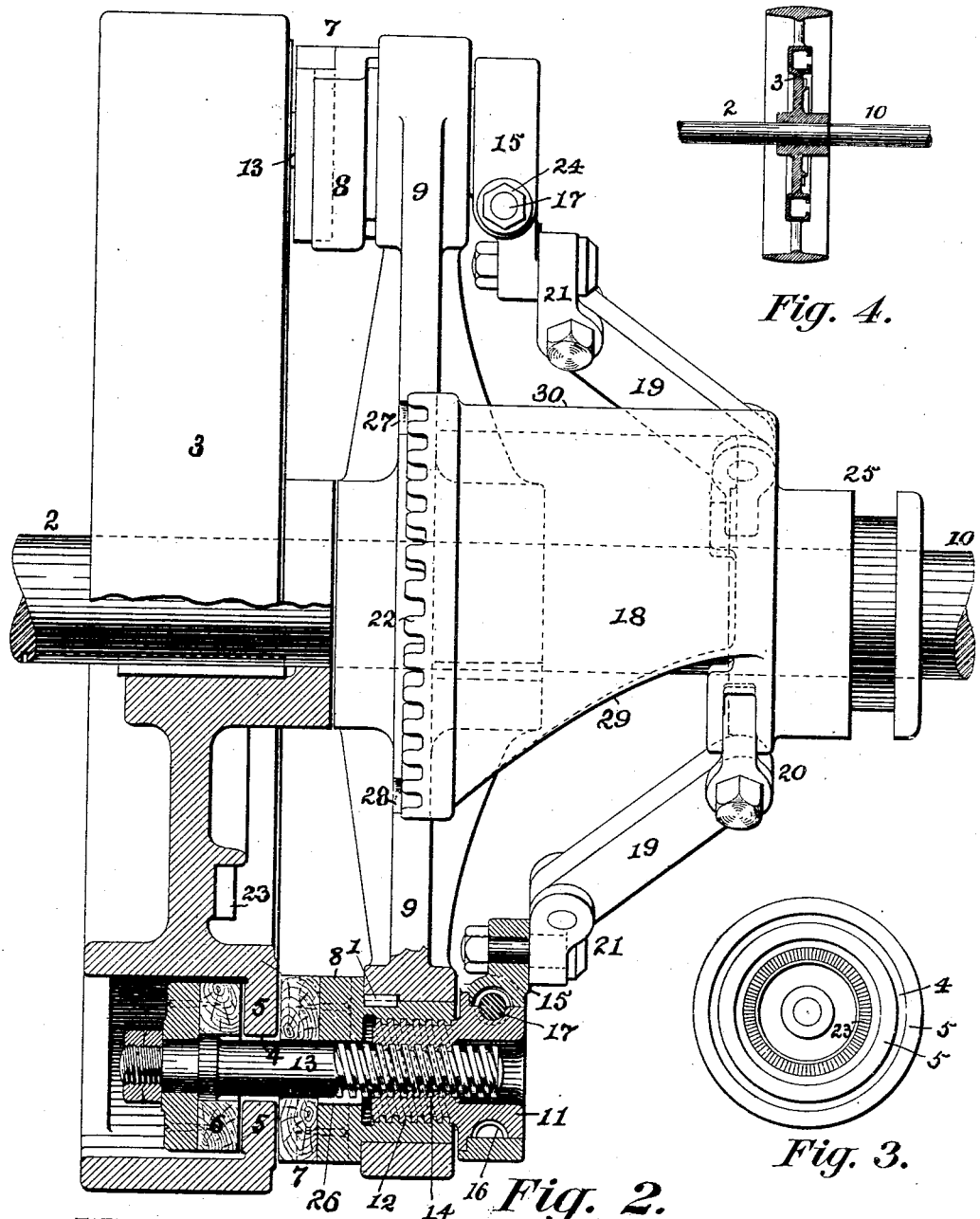

No. 713,341. Patented Nov. 11, 1902.
A. C. PESSANO.
CLUTCH FOR SHAFTS AND PULLEYS.
(Application filed Feb. 15, 1902.)

(No Model.) 3 Sheets—Sheet 3.

Witnesses
R. M. Kelly
E. Gall

Inventor
Antonio C. Pessano
By his atty

UNITED STATES PATENT OFFICE.

ANTONIO C. PESSANO, OF PHILADELPHIA, PENNSYLVANIA.

CLUTCH FOR SHAFTS AND PULLEYS.

SPECIFICATION forming part of Letters Patent No. 713,341, dated November 11, 1902.

Application filed February 15, 1902. Serial No. 94,163. (No model.)

*To all whom it may concern:*

Be it known that I, ANTONIO C. PESSANO, of the city and county of Philadelphia, State of Pennsylvania, have invented an Improvement in Clutches for Shafts and Pulleys, of which the following is a specification.

My invention has reference to clutches for shafts and pulleys; and it consists of improvements fully set forth in the following specification and shown in the accompanying drawings, which form a part thereof.

The object of my invention is to provide means in a clutch which shall cause the gripping parts to so act upon the gripped parts that compensation for wear will be automatically made and the power-transmitting capacity shall be proportional to the load, limited only by the strength of the structure of the clutch and the possible friction created. In this manner the power-transmitting action of the clutch is automatically increased by the act of putting the clutch into operation and continues to increase until the driven part is rotating with a speed commensurate with that of the driving part. In addition to the above function of the clutch my object is, further, to provide means in the structure for positively locking or clutching the driving and driven portions of the clutch together, so that they move as a unit and cannot be made to slip under any degree of strain, sudden or otherwise.

In carrying out my invention I provide the driving part of the clutch with gripping devices adapted to grip the driven portion of the clutch, the said devices being positively operated by the power-shaft not only to rotate about its axis, but also to increase or decrease their gripping action upon or in respect to the driven part. They gradually increase their gripping action until the propeling effort overcomes the inertia or resistance of the load on the driven part and until the speeds of the driving and driven portions of the clutch are equal. In combination with such gripping devices I may employ positive clutching devices between the driving and driven parts, which lock them together as a unit after the driven part has increased its speed to that of the driving part. This relieves the gripping devices of further strain and, in effect, makes the driven part practically a mechanical unit with the driving part and its driving-shaft, and hence puts the entire load directly upon the engine or motive power.

While for convenience one part of the clutch is designated as the "driving" part and the other the "driven" part, these parts are interchangeable, as the clutch may be operated either way. Usually the controlling means for actuating the gripping-jaws and applying the clutch-teeth are carried with the driving part; but this part may equally well be termed the "driven" part, and consequently no special significance must be given to the application of these terms, they being made for convenience only. The clutched or driven part may be adapted to drive a shaft, a band-wheel, or other part, as desired.

My invention also comprehends many details of construction, all of which will be better understood by reference to the drawings, in which—

Figure 5:
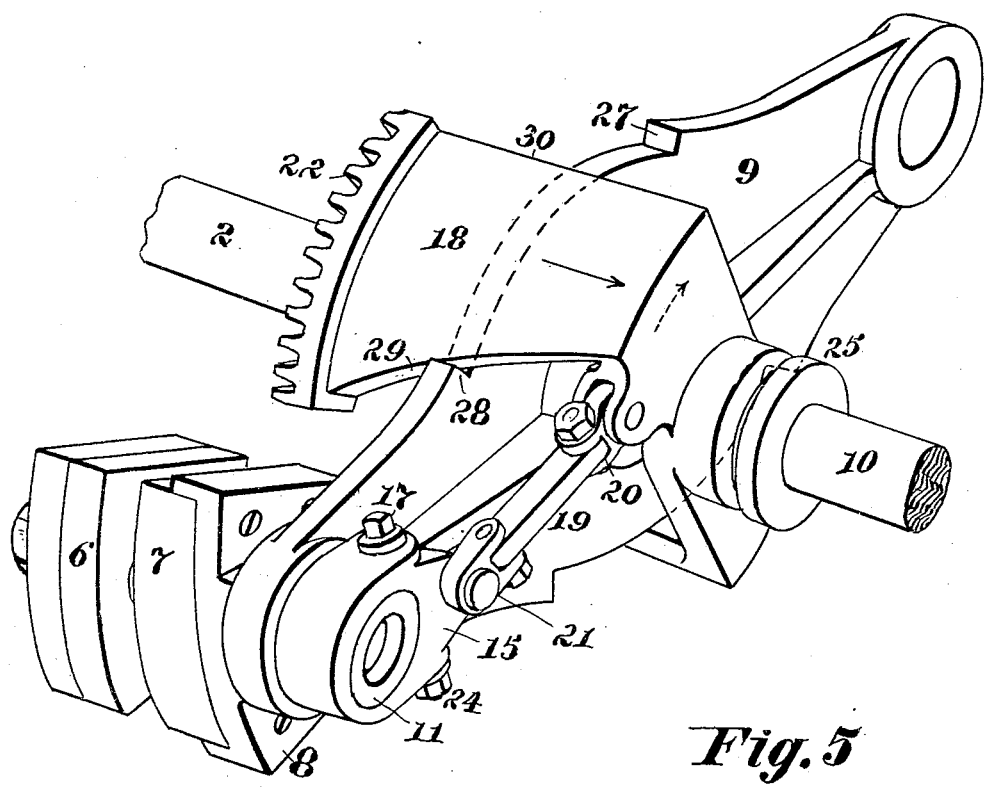

Figure 1 is a front elevation of the clutch with a portion broken away. Fig. 2 is a side elevation of same with a portion in section. Fig. 3 is a front elevation of the driven part. Fig. 4 is a cross-section of same when provided with a band-wheel rim, and Fig. 5 is a perspective view showing the means for operating the gripping-jaws.

The driven shaft 2 is keyed to the driven frame 3, which consists of a circular structure having a hub at the center, fitted and keyed to the shaft, and a hollow rim having the circular flanges 5 5 directed toward each other. In addition to these features this frame 3 is also provided with the circular rack 23, the function of which will be described later on.

10 is the driving-shaft and has secured to it the driving-frame 9, which carries the gripping-jaws 6 7 for gripping the flanges 5 of the driven frame 3. These gripping-jaws are carried by the frame 9 in the following manner: One of the jaws 7 is secured to a holder 8, fitted to the driving-frame 9, and to permit longitudinal adjustment, but not rotary motion, the holder held therein in an adjustable manner by means of a key 1 or otherwise. A bushing 11 is screwed at 12 into the said holder 8 and is provided with a crank 15, sleeved upon it and held in proper adjustment by a worm or screw 17 and worm-wheel screw 16, formed in the periphery of the bushing 11. By turning the worm or screw 17 any desired relative adjustment may be made between the parts 11 and 15, and at all times the said parts are locked together and move as a unit. The screw 17 may be locked against movement after adjustment by a lock-nut 24 or in any other manner. A bolt 13 is screwed into the bushing 11 at 14 and extends through the jaw 7 and slot 4 and supports within the frame 3 the other jaw 6, which may consist of a metal plate and facing of wood, the latter to press against the inner surfaces of the flanges 5 5 when in act of gripping. The jaw 7 may also be of wood, as shown, and grip upon the outer faces of the flanges 5 5. In this manner the said flanges are adapted to be gripped simultaneously between the two jaws 6 and 7, and any wearing due to the gripping action will come upon the wood, which is easily replaced. By the adjustment of the screw or worm 17 the relative positions of the two jaws 6 and 7 to or from each other can be varied so that with a given movement of the crank 15 proper gripping action upon the flanges 5 can be insured.

The bolt 13, while free to move longitudinally, is held against rotation by a key 26, carried in the holder 8, constituting the carrier of the jaw 7. As both the parts 13 and 8 may move longitudinally in the act of the jaws 6 and 7 gripping the flanges 5, it is evident that the rotation of the bushing 11 will cause the bolt 13 to be drawn outward, and as soon as the jaw 6 is in contact with flanges 5 will further cause the holder 8 to move inward until its jaw 7 comes into gripping operation. Then any further movement of part 11 causes both jaws to simultaneously tighten their grip and gradually put the driven part 3 into motion. The screws 12 and 14 are of different diameters and are shown of different pitches, so that it is evident that the power exerted by these screws is a differential one. So far as my invention is concerned, broadly considered, these screws may be of any relative pitch desired and both cut in the same direction, or one right and the other left handed, as preferred, as in all cases the rotation of the bushing 11 will be adapted to produce a relative opposite movement of the two jaws. Of course the greater the difference in the pitch of the two screws the quicker the gripping action; but this is a matter which may be varied to suit the designer and the character of loads to be handled.

In giving the above description of the gripping devices I have only referred to one set; but it is to be understood that there may be one or more sets, two such sets of jaws being shown. For heavy powers it is evident that a series of these gripping-jaws may be arranged about the shaft to multiply the power transmitted, such additions being mere duplication.

The cranks 15 are rocked by a reciprocating frame 18, which is loosely carried upon the shaft 10 and provided with an annular groove 25 for the reception of a suitable shifting mechanism of any well-known construction. This frame 18 is connected with the cranks 15 by links 19, which are jointed both to the frame 18 and to the cranks by universal connections 20 and 21, respectively. When the frame 18 is moved toward the frame 3, the obliquity of the links 19 to the shaft 10 is increased and the cranks 15 are turned, with the result of drawing the jaws 6 and 7 toward each other. This operation is insured because the straight edges 30 of frame 18 are guided upon the shoulders 27 on the driving-frame 9. When the frame 18 is in position shown, it is also held by the shoulders 28, but when moved to the left, as in gripping and clutching, the cam edges 29 are considerably clear of the shoulders 28. This gives to the frame 18 some freedom of rotation when releasing the clutch, and the result is that when the frame is moved to the right it may rotate slightly upon shaft 10, if the jaws 6 and 7 bind tightly, and then said edges 29, acting as cams on shoulders 28, induce the rotation of the cranks 15 and release of the jaws more quickly and with less expenditure of force. As soon as this action takes place the frame 9 advances upon frame 18 to the position shown in Fig. 2 and the jaws are quickly opened without liability of needless abrasion. In this construction it is evident that as there is no stop to limit the movement of the means for operating the gripping-jaws they continue to move until the gripping is fully accomplished each time. The result of this is also that the devices compensate for the wearing away of the jaws 6 and 7, so that no special adjustments are constantly required. The throw of the crank 15 increases gradually as the faces of the jaws wear away, and hence no adjustment is required, except at very great intervals. This self-adjusting capacity is an important feature of my invention.

Having described the manner of gripping the driven part by the driving part and securing the initial motion, I will now describe the means for positively clutching the driving and driven parts together to relieve the gripping-jaws of the severe strain of continuous driving which is necessary to other types of clutches. The shifting frame 18, which is moved toward the driven part in the act of closing the gripping-jaws, is provided with two curved racks 22, which are so located that just as the jaws 6 and 7 secure the full speed of rotation of the driven part 3 they engage with the teeth of the circular rack 23 on said driven part. The moment this is accomplished no undue strains or loads upon the driven part can cause it to slip in the jaws 6 and 7. After such engagement both the driving and driven parts are as if a unit and, in effect, transmit the power from the engine or motor direct to the load or work without reliance upon the gripping action of mere frictional devices. The result of this is that there is no danger of this clutch having its gripping-jaws rapidly worn or burned off, as so frequently happens with clutches heretofore in use. To insure ready engagement of the racks 22 and 23, I prefer to make the teeth tapered at the ends, so as to easily enter the spaces of the racks; but I do not limit myself to any special shape of these teeth. By making them of shape such as shown—namely, much like ordinary gear-teeth—they are capable of driving in both directions, and hence by a little adjustment the clutch can be used either right or left handed. There is no danger of breaking the teeth of these clutch-racks, because they are not brought together until both are rotating at the same or substantially the same speeds. The teeth of the rack 22 have enough play in the depth of the teeth of racks 23 to permit the compensating adjustment of the gripping-jaws for wear, as before pointed out.

In releasing the driven part the frame 18 is moved back, withdrawing the racks 22 from rack 23, and a further movement of said frame 18 releases the gripping-jaws 6 and 7. I have shown these racks 22 as two in number and of short length; but it is evident that one section alone may be used, or the said rack might be continued throughout a whole circle, such differences being wholly immaterial to my invention and only of importance when considering the strength of the material building up of the clutch. It is also evident that the teeth 22 may be substituted by a single tooth if made strong enough, so that I do not restrict myself to any form or number of teeth or clutching parts.

As before stated, the frame 18 is loosely supported upon the shaft 10, but is caused to rotate at the same speed as the shaft by the propelling action of the frame 9, the shoulders 27 of which acting upon the edges 30 of frame 18 force it around. While this is necessary for the function of operation of the gripping-jaws, it is also necessary for the clutching operation. It therefore follows that when the teeth 22 engage the rack 23 the propelling action of the former is due to the effort of the frame 9, exerted by its shoulders 27 on the edges 30 of the frame 18. When the disengagement of the racks takes place, the further movement of frame 18 causes it to rotate upon the shaft 10 and bring the cam edges 29 into play to assist in quickly opening the jaws 6 and 7. When the cranks 15 are to act to release the gripping-jaws, the narrow part of the frame 18, between the edges 30 and 29 will be in line between the shoulders 27 and 28, Fig. 5, and a movement of frame 18 to the right, Fig. 2, or in direction of solid arrow, Fig. 5, will cause it to revolve downward, Fig. 2, because the jaws 5 and 6 will not open at once and allow the cranks 15 to turn. When, however, the cam edges 29 strike shoulders 29 of frame 9, as in Fig. 5, the further movement of the frame 18 to the right will cause it to rotate upward, Fig. 2, or in the direction of dotted arrow, Fig. 5, and turn the cranks 15 to release the jaws 6 and 7. In this manner the cam edge 29 exerts a powerful influence to release the jaws. This being done, the frame 9 advances upon the frame 18 and the original positions of the parts shown in Fig. 2 are again taken and the clutch as a whole released.

It is evident that the details of these various parts may be much modified and changed without changing the principle of the invention. Hence I do not confine myself to the particular details shown, as these are not essential to the embodiment of my invention. The essential feature of my invention is the employment in a clutch structure of a friction gripping mechanism and a positive clutching mechanism adapted to be thrown into and out of operation in succession, and, inversely, in putting the driven part into and out of operation. More specifically considered, my invention may dispense with the clutching mechanism, since the special means shown of operating the gripping devices is useful for the transmission of smaller power. It is also evident that while I have described my invention as employed to drive one shaft from another it may be used to drive a pulley or other device instead. In Fig. 4 I have shown a pulley-rim formed upon the outside of the driven frame 3, and it is evident that such pulley-rim may be substituted by a grooved rim or toothed rim or any other of the well-known power-transmitting devices. The shafts 10 and 2 in this case may be a single shaft; but, of course, in such case the key shown between frame 3 and shaft 2 in Fig. 2 would be dispensed with.

Having now described my invention, what I claim as new, and desire to secure by Letters Patent, is—

1. In a clutch, the combination of a driving-frame, a driven frame, a gripping device to connect the driving-frame with the driven frame to put it into motion, a clutching device for mechanically locking the driving and driven frames together when in motion, and means for positively operating both the gripping and clutching devices successively in the inverse order on respectively connecting and disconnecting the two frames.

2. In a clutch, the combination of a driving-frame, a driven frame having a circular flange, a gripping device consisting of two oppositely-acting jaws adapted to grip the circular flange to connect the driving-frame with the driven frame to put it into motion, a clutching device for mechanically locking the driving and driven frames together when in motion, and positively-controlled means connecting the gripping and clutching devices and for operating them successively, whereby the clutching device only comes into action after the gripping device has performed its function of gripping and goes out of action before the gripping device goes out of action.

3. In a clutch, the combination of a driving-frame, a driven frame, a gripping device to connect the driving-frame with the driven frame to put it into motion, a clutching device for mechanically locking the driving and driven frames together when in motion consisting of a toothed part longitudinally movable upon the shaft of the clutch and adapted to rotate with one of the frames and engage with recesses in the other frame, and means for operating the gripping device actuated directly by the clutching-device frame.

4. In a clutch, the combination of a driving-frame, a driven frame, a gripping device to connect the driving-frame with the driven frame to put it into motion, a clutching device for mechanically locking the driving and driven frames together when in motion consisting of a toothed part longitudinally movable upon the shaft of the clutch and adapted to rotate with one of the frames and engage with recesses in the other frame, and means to move said toothed part and also operate the gripping devices for operating the gripping devices and clutching devices in the inverse order upon connecting and disconnecting the driving and driven frames.

5. In a clutch, the combination of two rotatable frames one of which is driven by the other, a sliding friction gripping device carried by one of the frames and adapted to grip the other frame, a controlled movable part also carried with one of the frames and mechanically connected with the gripping devices to operate them, and a clutch connected to and moved by the controlled movable part for positively clutching the two frames together to relieve the strain on the gripping devices after it has come into action and positively unclutch the parts before the gripping devices have gone out of action in disconnecting the two frames.

6. In a clutch, the combination of two rotatable frames one of which is driven by the other, a sliding friction gripping device carried by one of the frames and adapted to grip the other frame, a controlled movable part also carried with one of the frames and mechanically connected with the gripping devices to operate them, and means under and connected with the controlled movable part for positively clutching the two frames together to relieve the strain on the gripping devices consisting of a circular toothed rack on one of the parts and teeth adapted to engage therewith rotating with the other part and whereby it is actuated by the controlled movable part.

7. In a clutch the combination of a rotatable frame having a circular flange, a second independently-rotatable frame, a pair of oppositely-acting gripping-jaws movable to and from each other to grip the flange and carried by and movable relatively to the second rotatable frame, a screw-feed for moving the gripping-jaws in opposite directions also carried by the second rotatable frame and forming a connection between said frame and the two gripping-jaws, a crank for operating the screw-feed, a reciprocating frame independent of the gripping-jaws and their supporting-frame, and connecting-links between the crank and reciprocating frame whereby a reciprocation of the frame rocks the crank.

8. In a clutch, the combination of a rotatable frame having a circular flange, a second rotatable frame, a pair of gripping-jaws adapted to grip the circular flange, a screw-feed for moving the gripping-jaws in opposite directions carried by the second rotatable frame, a crank for operating the screw-feed, means for adjusting the crank relatively to the screw-feed to increase or decrease the gripping action of the jaws with a given movement of the crank, a reciprocating frame, and connecting-links between the crank and reciprocating frame whereby a reciprocation of the frame rocks the crank.

9. In a clutch, the combination of a rotatable frame having a circular flange, a second rotatable frame, a pair of gripping-jaws adapted to grip on opposite sides of the circular flange, a screw-feed for moving the gripping-jaws in opposite directions carried by the second rotatable frame and consisting of two concentric screw-threaded parts for moving the respective jaws and a screw-threaded bushing fitting them and adapted to move them simultaneously in relatively opposite directions, a crank for operating the bushing, and a controlled means for rocking said crank.

10. In a clutch, the combination of a rotatable frame having a circular flange, a second rotatable frame, a pair of gripping-jaws adapted to grip the circular flange, a screw-feed for moving the gripping-jaws in opposite directions carried by the second rotatable frame and consisting of two concentric screw-threaded parts for moving the respective jaws and a screw-threaded bushing fitting them and adapted to move them simultaneously in relatively opposite directions, a crank for operating the bushing, means for adjusting the crank circumferentially on the bushing, and a controlled means for rocking said crank.

11. In a clutch, the combination of a rotatable frame having a circular flange, a second rotatable frame, a pair of gripping-jaws adapted to grip on opposite sides of the circular flange independently movable relative to the second rotatable frame, a screw-feed for moving the gripping-jaws in opposite directions carried by the second rotatable frame and consisting of two concentric screw-threaded parts for moving the respective jaws and a screw-threaded bushing fitting them and adapted to move them simultaneously in relatively opposite directions, a crank for operating the bushing, clutching means for connecting the rotatable frames positively together to relieve the jaws, and controlled means independent of the second rotatable frame and jaws for rocking said crank and putting the clutching means into and out of operation.

12. In a clutch the combination of a rotatable frame having a circular flange, a second independently-rotatable frame, a pair of oppositely-acting gripping-jaws movable to and from each other to grip the flange and carried by the second rotatable frame, a screw-feed for moving the gripping-jaws in opposite directions also carried by the second rotatable frame and forming a connection between said frame and the two gripping-jaws, a crank for operating the screw-feed, a reciprocating frame independent of the gripping-jaws and second rotatable frame, clutching devices for connecting the rotatable frames together operated by the reciprocating frame, and connections between the reciprocating frame and the crank of the gripping-jaws, whereby the action of the jaws and the clutching devices come into action successively.

13. In a clutch, the combination of a rotatable frame having a circular rack with teeth of relatively small size, a second rotatable frame, a friction gripping device for connecting the frames to cause them to rotate together, a reciprocating frame rotating with the second rotatable frame and having teeth forming a segmental curved rack engaging with the circular rack, and means for operating the reciprocating frame whereby the gripping devices are put into action when the reciprocating frame is reciprocated.

14. In a clutch, the combination of a driving-frame, a driven frame, a gripping device to connect the driving-frame with the driven frame to put it into motion, a clutching device for mechanically locking the driving and driven frames together when in motion, and means for adjusting the relative time of gripping and clutching actions whereby the gripping may be advanced or retarded relatively to the time of action of the clutching operation.

15. In a clutch, the combination of a rotatable frame, a second rotatable frame 9 having shoulders 27 and 28, a gripping-jaw holder 8 carried in frame 9 and having jaw 7, gripping-jaw 6 and its operating-bolt 13 extending through holder 8, bushing 11 screw-threaded upon both the holder 8 and bolt 13 and having a crank 15, reciprocating frame 18 guided between the shoulders 27 and 28 and having the straight edge 30 and the cam edge 29 adapted to operate with said shoulders respectively, and a connecting-link between the frame 18 and the crank, whereby the crank is directly operated to move the jaws together by a straight reciprocation of the frame 18 but is operated to open the jaws by a combined reciprocation and rotary movement of the frame 18.

16. In a clutch, the combination of a rotatable frame having a circular rack 23, a second rotatable frame 9 having shoulders 27 and 28, a gripping-jaw holder 8 carried in frame 9 and having jaw 7, gripping-jaw 6 and its operating-bolt 13 extending through holder 8, bushing 11 screw-threaded upon both the holder 8 and bolt 13 and having a crank 15, reciprocating frame 18 guided between the shoulders 27 and 28 and having the straight edge 30 and the cam edge 29 adapted to operate with said shoulders respectively and also having teeth 22 adapted to engage the rack 23, and a connecting-link between the frame 18 and the crank, whereby the crank is directly operated to move the jaws together by a straight reciprocation of the frame 18 but is operated to open the jaws by a combined reciprocation and rotary movement of the frame 18 and also clutch the two rotatable frames together when the gripping-jaws are in full action.

17. In a clutch, the combination of a rotatable frame having a circular flange, a second rotatable frame, positively-acting jaws for gripping the flange and carried by the second rotatable frame and formed with concentric screw-threaded portions, a rotary bushing screwed upon the screw-threaded parts of the jaw and having a worm-wheel screw 16, a crank 15 sleeved upon the bushing, a worm or screw 17 carried by the crank and meshing with the screw 16, and controlled means rotating with the second rotatable frame for rocking the crank.

18. In a clutch, the combination of a rotatable frame having a circular flange, a second rotatable frame, positively-acting jaws for gripping the flange and carried by the second rotatable frame with freedom of movement to and from the circular flange and formed with concentric screw-threaded portions, keys to cause said screw-threaded portions of the jaws to be held against relative rotation and also against rotation on the second rotatable frame, a rotary bushing screwed upon the screw-threaded parts of the jaws and having a worm-wheel screw 16, a crank 15 sleeved upon the bushing, a worm or screw 17 carried by the crank and meshing with the screw 16, and controlled means rotating with the second rotatable frame for rocking the crank.

19. In a clutch, the combination of a rotatable frame having a circular friction-surface, a second rotatable frame, a friction-jaw adapted to press upon the friction-surface and carried by the second rotatable frame, a screw-feed for moving the friction-jaw, an adjustable crank for operating the screw-feed, a reciprocating frame movable upon the second rotating frame, and connecting means between the reciprocating frame and the crank of the screw-feed, whereby the latter is positively operated and also compensates for all wear of the friction-jaw.

In testimony of which invention I have hereunto set my hand.

ANTONIO C. PESSANO.

Witnesses:
R. M. HUNTER,
J. W. KENWORTHY.